US009310253B2

United States Patent
Katz

(10) Patent No.: US 9,310,253 B2
(45) Date of Patent: Apr. 12, 2016

(54) SINGLE TECHNOLOGY MICRO-MOTION OCCUPANCY SENSOR SYSTEM

(71) Applicant: Fred Katz, Hauppauge, NY (US)

(72) Inventor: Fred Katz, Hauppauge, NY (US)

( * ) Notice: Subject to any disclaimer, the term of this patent is extended or adjusted under 35 U.S.C. 154(b) by 0 days.

(21) Appl. No.: 14/597,302

(22) Filed: Jan. 15, 2015

(65) Prior Publication Data

US 2016/0011053 A1    Jan. 14, 2016

Related U.S. Application Data

(60) Provisional application No. 62/024,301, filed on Jul. 14, 2014.

(51) Int. Cl.
*G01J 5/00* (2006.01)
*G01J 5/34* (2006.01)

(52) U.S. Cl.
CPC . *G01J 5/0025* (2013.01); *G01J 5/34* (2013.01)

(58) Field of Classification Search
CPC .................................. G01J 5/34; G01J 5/0025
See application file for complete search history.

(56) References Cited

U.S. PATENT DOCUMENTS

| 9,014,829 | B2* | 4/2015 | Chemel | G01D 18/00 700/19 |
|---|---|---|---|---|
| 2002/0134849 | A1* | 9/2002 | Disser | F24F 11/0034 236/47 |
| 2003/0090219 | A1* | 5/2003 | Kazanov | H05B 39/08 315/291 |
| 2006/0267566 | A1* | 11/2006 | Williams | H05B 37/0218 323/282 |
| 2007/0040676 | A1* | 2/2007 | Bandringa | G08B 29/183 340/567 |

* cited by examiner

*Primary Examiner* — David Porta
*Assistant Examiner* — Mindy Vu
(74) *Attorney, Agent, or Firm* — John F. Vodopia

(57) ABSTRACT

A micro-motion occupancy sensor system monitors for a presence of a person in a room, in different monitoring modes, to regulate power delivery to the room. The micro-motion occupancy sensor has a multimode lens for receiving passive infrared (IR) energy and focusing the IR energy as a series of IR beams, a pyroelectric detector to receive the focused IR beams and generate an electrical signal, a processing circuit to amplify, filter and processes the electrical signal to generate an interrupt signal and an analog output signal and a controller that receives and processes the interrupt signal and the analog output signal to determine whether a person has entered a room or is maintaining their presence within the room. The controller controls the processing in a vacant mode where a person's presence is not detected and in an occupied mode when a person's presence has been detected.

16 Claims, 4 Drawing Sheets

SINGLE TECHNOLOGY MICRO-MOTION OCCUPANCY SENSOR SYSTEM

CROSS-REFERENCE TO A RELATED APPLICATIONS

The invention described and claimed hereinbelow claims priority under 35 USC §120 from U.S. Provisional Patent Application Ser. No. 62/024,301, filed. Jul. 14, 2014, the contents of which are incorporated by reference herein.

BACKGROUND OF THE INVENTION

The invention relates broadly to occupancy sensors and more specifically to a single technology micro-motion occupancy sensor system that is sufficiently sensitive to identify a presence of a sedentary person in a room in order to control electrical power delivery to the room.

Occupancy sensors were developed to determine when a person is in a predetermined volumetric space and supply electrical power thereto only if one or more persons are present. Typically, some fixed time after a last presence in the space is detected (e.g., using a motion sensor), an electrical power delivery circuit to the space is opened, which cuts off all appliances and fixtures connected thereto from the electrical supply. One of the shortcomings of known occupancy sensors, however, is that they miss a presence of sedentary persons.

As used herein, predetermined volumetric space is meant to convey a space that is covered by an occupancy sensor system, such as an enclosed space or room, a portion of an enclosed space or room, or an open space having a volumetric extent covered by the occupancy sensor or occupancy sensor system (referred to interchangeably herein as space, volume or room).

Many known occupancy sensor systems include and rely upon a Passive Infrared (PIR) motion sensor to identify occupants of a room or space. PIR motion sensor systems detect or identify a person's presence when the person (or persons) move in front of the sensor receiver, or pass the sensor system receiver. Such movement in front of the sensor receiver results in an increase in the amount of IR energy received at the time of the movement, i.e., the presence adds IR energy to the ambient IR energy of the passive IR beam received by the sensor system. But as suggested above, such known PIR occupancy sensor systems can miss a presence of a sedentary person, typically because when "covering" a large volumetric space or room, conventional PIR occupancy sensor systems fail to detect "small" motions of a substantially sedentary person. The phrases "small motions" or "substantially sedentary" should be interpreted herein as motions of parts of a person who is not moving from one location to another, for example, writing or inputting data through a computer or cell phone keyboard or other input device.

Again, many conventional PIR occupancy sensor systems, particularly based on direction of the receiving port, are unable to detect small motions of a substantially sedentary person because the small motion does not cross one of the passive IR beams. Hence, if the occupancy sensor system is used to control a light, for example, and the person is sitting at a desk, the power to the light will be interrupted after a fixed time (typically set by the manufacturer) and the light will turn off. In order to have the light turned back on, the person would have to move a sufficient amount to cross one of the passive beams of the occupancy sensor system and wave their hands in some circumstances, actually stand up from his/her chair and walk to or past the conventional PIR occupancy sensor system.

Attempted solutions to this problem are known. One attempted solution relies upon a use of dual technology: a passive infrared motion sensor system and a Doppler acoustic sensor. The Doppler sensor, which operates as a sonar (sound navigation and ranging) system, is capable of detecting minimal human motion. Use of Doppler sensors, however, comes with its own problems. For example, Doppler sensors have a tendency to occasionally raise false alarms and perhaps as importantly, there is an additional cost associated with adding the Doppler sensor as they require additional transmit/receive transducer(s), amplification and detection circuitry and a controller programmed to orchestrate the system operation.

SUMMARY OF THE INVENTION

The present invention overcomes the shortcomings of known arts, such as those mentioned above.

To that end, the invention provides a single technology, physical passive infrared (PIR) occupancy sensor system configured to operate between two modes of operation, vacant and occupied, where operation in the vacant mode is particularly sensitive to detecting a presence of sedentary persons in a covered volume or space.

In an embodiment, the inventive PIR occupancy sensor system includes a multimode lens having an acquisition section and a micro-motion section. Micro-motion sensing partitions (or lenslets) of the multimode lens respond to tiny movements of a human in an area or volume covered defined by the micro-motion sensing lenslets. These micro-motion lenslets are supplemental to the larger acquisition lenslets, which may also sense some of the micro-motions. The result is a highly sensitive occupancy sensor system with less physical components and a more economical bill of materials than those known in the conventional arts.

In greater detail, the inventive PIR occupancy sensor system is constructed to enable two distinct, independent modes of operation: vacant and occupied. The vacant mode of operation may be said to be based on a premise, or system determination, that the room or volume being monitored is unoccupied. In the vacant mode of operation, the sensor system relies on the outer rings of a multimode lens that focuses and directs received IR beams to detect when a person enters the perimeter of the sensor system coverage area.

The sensor system, including the multimode lens, preferably is located or positioned on a ceiling or wall in the volume or room. Most preferably, the PIR occupancy sensor system is positioned on a ceiling above an expected location at which a person might reside in a sedentary position, for example, above a desk or computer station. But while a ceiling mounted installation may be preferred, the invention is not limited in any way thereto, i.e., the system may be wall mounted, mounted on a pole as long as its positioning provides the desired or required coverage. Operation is merely optimized by an arrangement where a center of a either a circular (rectangular, etc.) detector array is pointed towards the most likely location of a minimally active human, is weighted for a denser passive beam pattern.

As the person approaches the desk (again, in a vacant mode of operation), he/she crosses the passive IR beam that is received by and directed by lenslets present in outer annular rings of the multimode lens. The energy added by the person's body and received by the larger, outer ring lenslets (acquisition), generates a fairly strong infrared signal that is converted into a strong electronic signal. The electrical signal is processed and the operating mode changes from the vacant mode to the occupied mode in response to the detection. Because the sensor system is preferably pointed towards the person, not the desk or the background, from a position on the ceiling or wall, the circular center and the adjacent ring(s) of pie shaped lenslets of the multimode lens is primarily utilized once the system is "aware" that there is a human "target" is in its field of view.

The passive IR beams are a group of (passive) optical trajectories that each extend from the target or background and impinge on the active area of the detector (focused or directed by each lenslet). The collection of all of these passive beams constitutes the Field of View of a unit. The geometry of this FOV is determined by the straight optical path of each of the individual beams, as determined by the design of the lenslets that as a group determine the active area of the lens. These beams are all focused ultimately onto a front window of the detector component.

The receiving surface area of the multimode lens comprises circular array formed of two or more annular segments or rings surrounding a central area circumscribing the physical axial center of the multimode lens. The central area as well as the rings or annular segments are formed with sub-arrays of lenslets particular to each of the rings/central area. In one form, the central area of the circular array is divided into four quadrants, surround by an annular segment formed as a ring of very close together truncated-pie-shaped lenslets, which truncated-pie-shaped lenslets create a beam pattern that is very dense (consisting of many beams close together). Consequently, even tiny motions of a mostly sedentary person result in a crossing of at least one of these beams, which, in the occupied mode, operate to maintain the occupied mode even in view of the occupied person's very limited movement.

The novel multimode lens may is constructed with a dense, physically small, array of lenslets, there is less infrared energy impinging on each lenslet and the resultant beam yields resultant beams that affect a significantly weaker electrical signal. But the inventive PIR occupancy sensor system compensates for these inherently weaker signals by increasing the gain of the amplifying circuitry when in the occupied mode. In addition, a (gain) curve of gain versus frequency may be modified to be more amenable to the requirements of the inner beams, i.e., the passive IR beams captured by the lenslets populating the central area or rings radially proximate thereto. This is due to the fact that smaller lenslets (size of the lenslets decreases with proximity to the axial center) have more high frequency content and slow micro-motions have more low frequency content. The gain change results in being able to detect very small micro-motions. Preferably, gain is increased in the occupied mode to just below the level that noise would trigger the sensor system. If there is an occasional false trigger, it is of negligible importance since it would only result in the lamp or other appliance staying on slightly longer.

Initially, when entering the occupied mode, a time delay counter starts counting down to zero from a fixed value. If a signal generated by a received passive IR beam indicates that a person is present (i.e., detect a person's motion), the counter's delay value is increased by a fixed amount. This is done until a maximum value is attained. If no (presence) signal is detected, the delay count is periodically decreased by a different value. When the delay counter goes down below zero, this indicates that there is no person present and the sensor system switches back to the vacant mode. In response, a message is sent that the monitored area is unoccupied. In other words, the more detected motions in a room, the longer the occupied state is maintained before the mode is switched from occupied to vacant. This results in an occupancy sensor system that is far more responsive to determination of the presence of a sedentary room occupant.

Please note that this approach is not limited to persons seated at tables, desks or computer stations, but operates with persons in beds, for example, at a home, hospital, hospice, hotel rooms, etc., without limitation. Many processes and automatic devices other than lights or HVAC services may be controlled by the inventive PIR occupancy sensor system, for example, flush toilets or any other functions dependent on occupation of space by a human or animal.

In an embodiment, the invention provides a micro-motion occupancy sensor system that monitors for a presence of a person in a room, in different monitoring modes, to regulate power delivery to the room. The sensor system comprises a multimode lens for receiving passive infrared (IR) energy and focusing the IR energy as a plurality of passive IR beams, a pyroelectric detector for receiving the focused IR beams from the multimode lens and generating an electrical signal based on the received, focused IR beams, a processing circuit that includes an amplifier and a filter, for processing the resultant electrical signal and generating an interrupt signal and an analog output signal based upon the electrical signal and a controller for receiving and processing the interrupt signal and the analog output signal to determine whether a person has entered the room or is maintaining their presence within the room. The controller controls the processing in a vacant mode of operation where a person's presence is not detected and in an occupied mode of operation when a person's presence has been detected.

In the occupied mode, the controller generates and sends a gain control signal to the processing circuit to boost the gain of the amplifier therein. The controller identifies a sufficient change in signal level to determine person's presence. In occupied mode, the mode is maintained for a predetermined timeout period and wherein if no increase in the analog signal level is detected before an end of the predetermined timeout period, the controller changes the mode from occupied to vacant.

In the vacant mode, the controller changes to the occupied mode if a presence of a person is detected and the amplification is increased while in the occupied state, and after a timeout period where no motion is sensed, the system reverts to the vacant state with lower amplification.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

Figure 1:
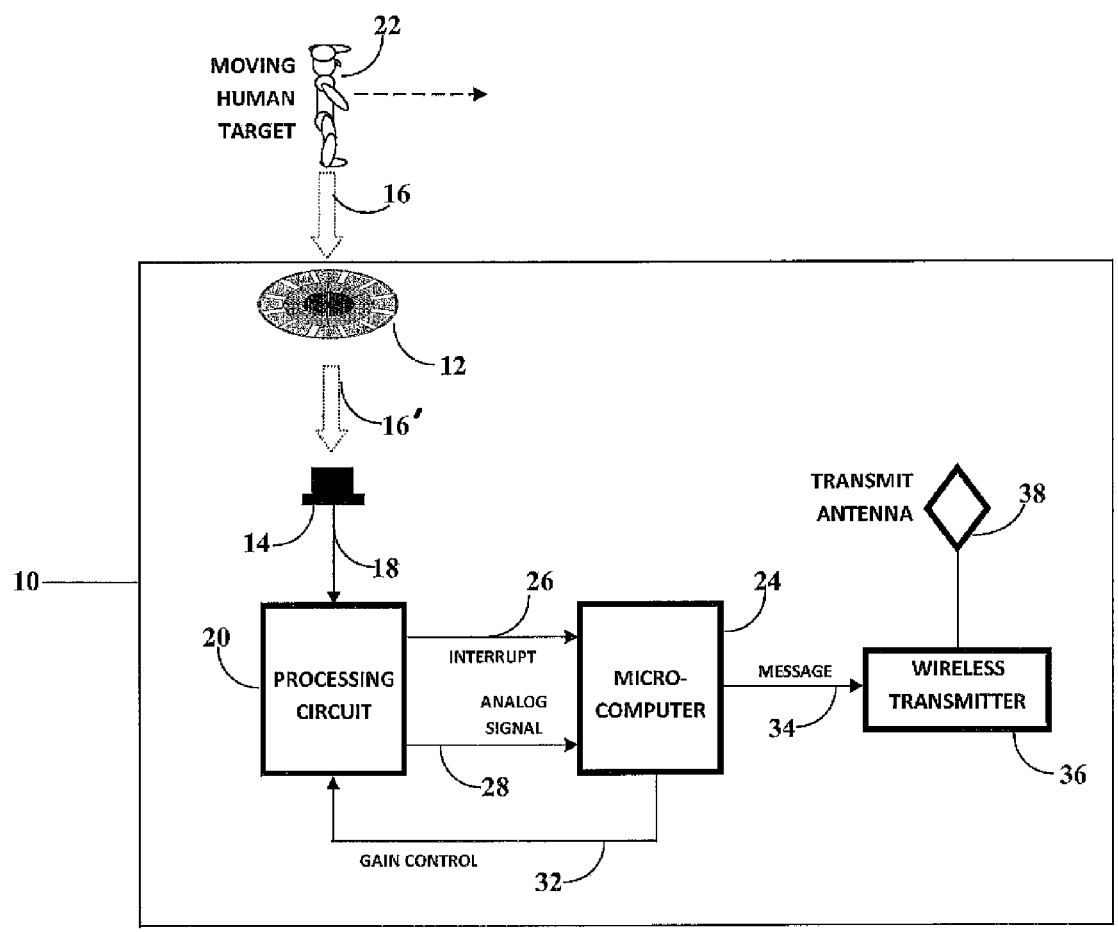
FIG. 1 depicts one embodiment of a PIR occupancy sensor system according to the invention.

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

This invention provides a passive area occupancy sensor system that operates in two modes (vacant and occupied) to accurately determine a presence of a person in a room and, therefore, whether to supply of electrical power thereto, particularly in a case where a person present is substantially sedentary and likely not to be detected by known occupancy sensors and sensor systems.

In an embodiment, each time there is a mode change from vacant to occupied or from occupied to vacant, an output level changes logical state (reflecting same change) and/or a wireless message is transmitted indicating the change of mode. Preferably, the sensor system is mounted above or otherwise directed at a normal location of the room occupant when that occupant is in a sedentary situation During sensor system operation in a vacant mode, as an occupant crosses a passive infrared (IR) beam being received by the sensor system, the mode changes from vacant to occupied. In response, a message is sent wirelessly, or via other communication modalities, to indicate to the power control system (e.g., a heating system, cooling system, lighting system, electrical circuit branch) that the room or volume is occupied. If the person leaves a room (where the sensor system is in the occupied mode), where no further movement is sensed after a fixed time period, the system determines that there is no person present, resets the mode to vacant and transmits a message to a command center to convey same. For example, the message might comprise merely changing a global mode state variable or flag, or actually transmitting a message or communication to power control hardware or a monitoring station.

In the occupied mode, the amplification of the detector signal is increased, since smaller signals are expected where the occupying person is sedentary, due to the fact that the smaller inner beams will most likely be the ones stimulated by small movements. That is, if the person's movements are small, only part of an arm might influence the received IR beam, realizing a smaller and less pronounced increased in IR and therefore, an electrical detection signal commensurate therewith. Also in occupied mode, a preset delay is set in a delay counter. If no activity is sensed, that delay amount keeps getting incrementally reduced. If the delay drops below zero, the sensor system changes back to vacant mode. If tiny activity is sensed (small movements from an almost sedentary person), the delay counter value or number is incrementally increased. Increasing the delay counter results in the sensor system maintaining the occupied mode for longer and longer.

The occupancy sensor system in one embodiment is a two-speed circular multimode lens comprising a central area surrounding an axial center of the disk-like structure and three annular segments surrounding the central area at varying radial positions relative thereto. For example, the two outer annular rings of the multimode lens are configured to acquire a target as it crosses the passive IR beam being received via the lens, into the FOV, giving rise to a fairly large electronic or electrical signal commensurate with the high level detected change in beam IR energy content. The larger the physical area of each of the acquisition lenslets, the larger the amount of infrared energy that is focused on the detector (there is a proportionality between the size or surface area and the amount of energy captured thereby). The optical energy is related to the f-stop of each lenslet, which is the ratio between the diameter of the lens divided by the focal length of the optics. Once the occupant is seated in a sedentary state, the inner circular array of lenslets, closer to the central area than the outer two rings, responds to minimal detected motion(s). In order to respond to these small signals, the system gain (amplification) is increased. Since the unit is already in the occupied mode, false triggers are not as severe a problem as when the unit is in the vacant mode.

The invention is not limited to the exact pattern illustrated, but extends to any lens design that has a combination of lenslets that are spread out and lenslets that are close together.

The invention requires that the amplification for the detector signal be variable and controlled by a microcomputer. This allows for the microcomputer to calibrate the newly manufactured sensor system for optimal setting in the vacant mode. Such calibration results in cancelling out the significant effects of component variation and custom tunes the occupancy sensor system to the best possible performance.

In addition, during times of no detections (vacant mode operation), the microcomputer can heuristically adjust its gain during periods. This is done by increasing the gain to the point of where the unit starts is deliberately induced to generate detection signals that would be considered false alarms if it was not being calibrated. These false alarms occur during a calibration routine and are not acted upon and no messages are transmitted or mode changed. Once the microcomputer knows what gain setting results in false alarms, slightly less gain can be used in the occupied mode for optimal results. This results in a "hair-trigger" like system that will respond to the tiniest amount of human activity.

PIR occupancy sensor system 10 is shown schematically in FIG. 1 to include a special, disk-like multimode lens 12 positioned in front of a pyroelectric detector 14. The received energy is focused though a multitude of lenslets (little individual lenses). Where no person is present, the multimode lens 12 receives ambient infrared radiation, as a continuous or substantially continuous passive IR beam 16 at each of a plurality of lenslets (to be discussed in greater detail below). The detector 14 operates to receive infrared radiation "collected" by the multimode lens properties.

That is, each lenslet has an optical path associated with it that concludes at the detector 14. Prior to termination at the focal point, which is the detector 14, the beam associated with an individual lenslet passes through that lenslet's optical center. Each of these passive beams go out in a divergent fashion, based on the geometric location of the lenslets. As a person walks through the Field of View (FOV), they will cross between areas penetrated by beams or through spaces where there are no beams. When they pass through a beam, their infrared radiated energy (due to the person's surface temperature) is focused through the lenslet onto the detector, changing the net infrared energy impinging on a crystal within the pyroelectric detector 14. This difference causes a heating or a cooling of the crystal of the detector. The crystal is fastened in position (in the detector) so that it cannot expand or contract as its temperature changes in response to more or less infrared energy impinging on its' surface. Since the crystal cannot change size, stress is generated within the piezoelectric material (comprising the crystal) causing the generation of a tiny voltage across the crystal's surface.

That is, the pyroelectric detector 14, which senses the IR beam 16', responsively generates an electrical signal 18 commensurate with the magnitude of the detected IR signal energy therein. The electrical signal generated by the pyroelectric detector is processed by a processing circuit 20, which amplifies, filters the electrical signal. After amplification and filtering, the processing circuit 20 generates two signals that are output to a microcomputer 24. The first of the two signals is an interrupt signal 26 and the second of the two signals is an analog output signal 28.

The interrupt signal 26 and the analog output signal 28 are processed by the microcomputer 24 to determine which mode or state of operation the system is in an occupied mode or a vacant state. Depending on the which of two states of operation, occupied or vacant, the gain or amplification factor of the processing circuitry 20 is adjusted. When the analog signal 28 is applied to the microcomputer 24, it is converted into a digital value by use of an onboard analog to digital converter (within the microcomputer) and this digital data is processed to determine if there is signal content indicative of a human moving through the passive beam pattern. Please note that while element 24 is identified as a microcomputer, it is not limited thereto but may embody any type of known processor, controller or microcontroller programmable to process the interrupt signal 26 and the analog output signal 28 and determine which mode or state of operation the system is in, according to the inventive principles. In the occupied mode, the microcomputer 24 sends a gain control signal 32 to the processing circuit 20. The gain control signal 32 is processed to boost the gain of the amplifier to better detect small movements made by a sedentary person.

When the microcomputer 24 identifies (from the analog output signal 28) a change from an occupied mode to a vacant mode, or from vacant mode to an occupied mode, a message signal 34 is generated. The message signal 34 operates as a flag indicating the change of mode. In the embodiment shown, the generated message signal 34 is provided to a wireless transmitter 36, which transmits the signal via a transmit antenna 38. Please note, however, that other scenarios for communicating the change of mode or message signal 34 may be implemented without deviating from the scope and spirit of the invention. For example, the microcomputer can be directly wired to a message receiver by which the flag or global message variable is communicated, or connected via the internet to a command center, where the message signal is provided in an HTTP or HTTPS protocol. Under such circumstances, the wireless transmitter 38 and antenna 38 can be eliminated.

In vacant mode, the microcomputer is normally in a "sleep" state and is awakened when an interrupt signal 26 is received. For example, if a person 22 passes before the multimode lens 12, his/her presence results in an increase in IR energy in received/focused passive IR beams 16, 16', which is recognized by the processing circuit 20. The increase in energy (indicating presence of a person) results in an interrupt signal 26 and an analog signal 28 output from the processing circuit 20 to the microcomputer 24, to change the mode from vacant to occupied. The arrangement where the microcomputer 24 "sleeps" until awakened by a presence of the interrupt signal 26 saves power, which is particularly advantageous when the system 10 is battery powered.

Figure 2A:
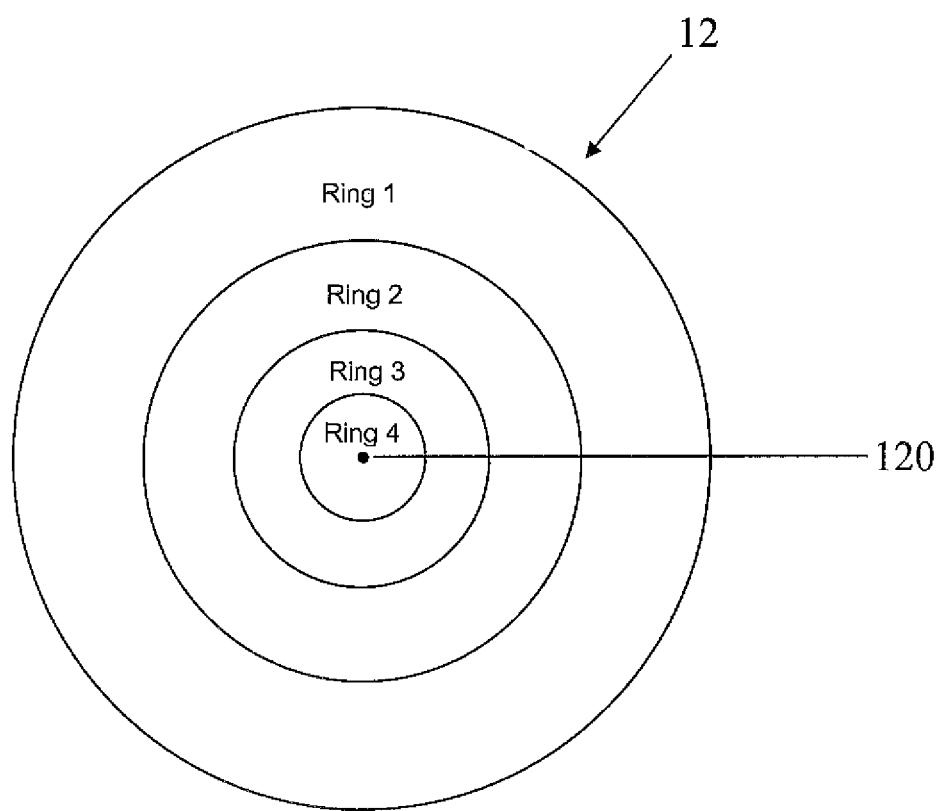
FIG. 2A depicts a multimode lens included as part of the PIR occupancy sensor system.
Figure 2B:
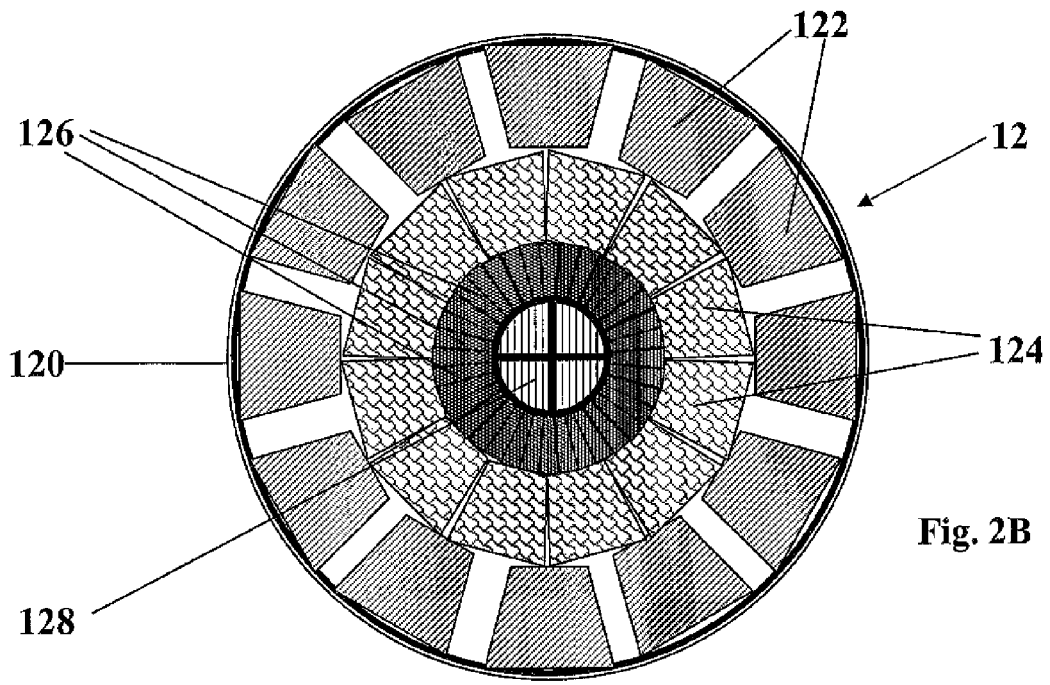
FIG. 2B highlights the lenslet sub-arrays of the various rings and central area of the multimode lens shown in FIG. 2A.
Figure 2C:
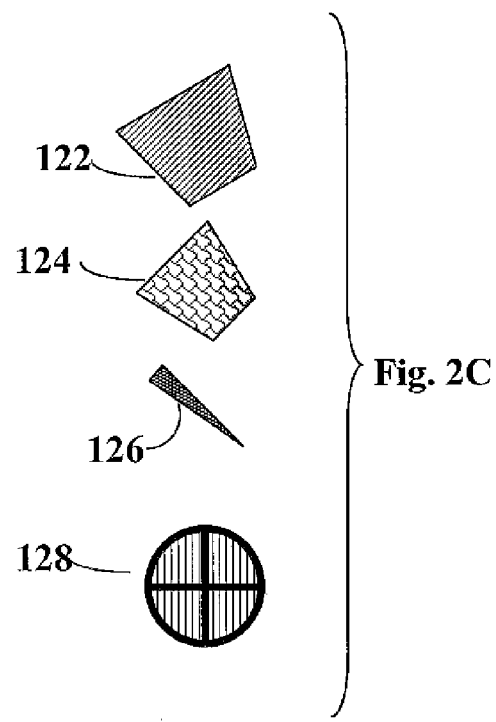
FIG. 2C highlights the various lenslets found in the central area and lenslet sub-array of the multimode lens shown in FIG. 2A.

FIGS. 2A, 2B and 2C together depict details of the multimode lens 12 of system 10 in greater detail. The multimode lens 12 includes an outer annular segment proximate the lens perimeter, identified as Ring 1 in FIG. 2A. Another annular segment proximate Ring 1, but radially closer to an axial center 120 of the lens than is Ring 1, is identified as Ring 2 in FIG. 2A. Another annular segment proximate Ring 2, but closer to the axial center 120 than either Ring 1 or Ring 2 is identified as Ring 3 in FIG. 2A. And a central area proximate Ring 3 that surrounds the axial center 120 is identified as Ring 4 in FIG. 2A.

FIG. 2B highlights that Ring 1 comprises a plurality or sub-array of first lenslets 122, that Ring 2 comprises a plurality or sub-array of second lenslets 124, that Ring 3 comprises a plurality or sub-array of third lenslets 126 and that Ring 4 (which is more a central area than a annular segment or ring) comprises a plurality or sub-array of fourth lenslets 128, which surround the lens axial center 120. A lenslet is an individual lens with an optical center that corresponds to the center of a passive beam if a line is drawn from the pyroelectric detector to the lenslet's optical center. The purpose of this myriad of lenslets is to create a multitude of passive infrared beams that require only a tiny motion to intercept them and create an electrical response in processing circuit 20.

FIG. 2C highlights the first 122, second 124, third 126 and fourth 128 lenslets, respectively. The Ring 1 and Ring 2 lenslets 122, 124 are used to acquire the beam 16 whether same includes IR reflecting an ambient state with no person crossing in from of the lens 12 or where a person is proximate to or crosses in front of the lens 12, adding IR to the ambient state. First lenslets 122 are trapezoidal shaped and larger than second lenslets 124, which also are trapezoid-shaped. Second lenslets 124 are larger than third lenslets 126, which are pie shaped as shown. Ring 3 is more densely populated with third lenslets 126 than both Rings 1 and 2 are populated with first and second lenslets 122 and 124. In the embodiment shown, 4 of the fourth lenslets surround the axial center 120.

It should be noted that in the embodiment shown, Ring 1 and Ring 2 are offset 50% from each other to improve sensitivity to radial motion trajectories. Radial motion is defined as motion in a direction perpendicular to a line drawn from the moving subject to the center of the lens of the unit. Lenslets 122, 124 are much larger than the lenslets 126 and 128 (which are more central) and, therefore, generate a larger infrared change resulting in a stronger electrical signal when there is motion. The actual quantity and shape of lenslets in each ring may vary in order to optimize detection in the vacant and occupied modes for different product types. As explained above, electrical signals result from the target (human's) motion as the human crosses from one beam to another and the passive beams are directed by the lenslets to the detector. Because the micro-motion lenslets are smaller and closer together, the target does not have to move as far to cross a beam, since the beams are closer together. Likewise, the electrical signal generated (by the detector upon receipt of the beam) also is of a smaller magnitude and requires more amplification. That is why the amplification is increased when the state is changed from vacant to. These tiny changes are amplified by a high gain amplifier into useful electrical signals which are then processed.

Figure 3:
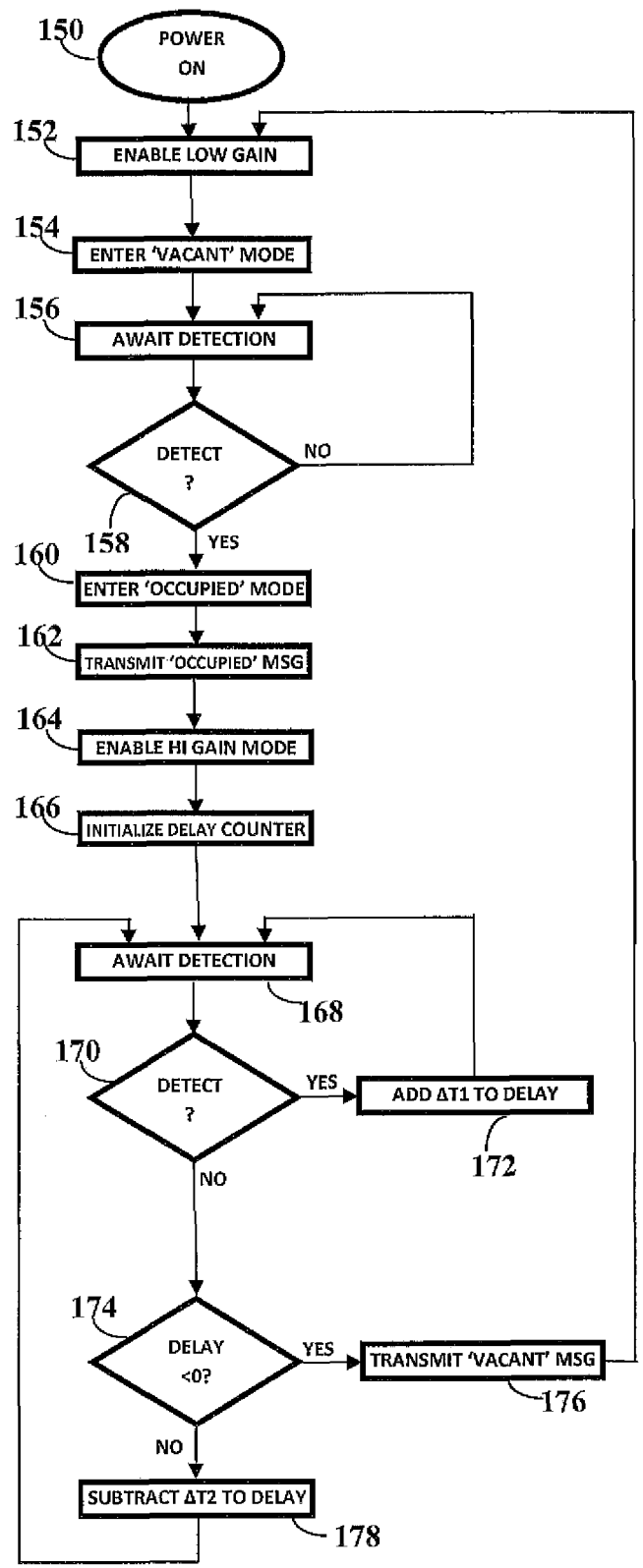
FIG. 3 depicts a flow chart describing a method of operating the PIR occupancy sensor system.

FIG. 3 presents a flow chart depicting operation of the PIR occupancy sensor system 10, first depicted in FIG. 1. Round start indicator 150 represents the start of operation, or power on, when power is first applied to the sensor system 10. At power on, the sensor system processes into a low gain configuration, indicated by box 152, enters into a vacant mode, indicated by box 154 and awaits a detection of person present (by movement, as explained above), as indicated by box 156. Decision diamond 158 indicates that the system processes to determine whether person's presence in the room or volume is detected. If no presence is detected, processes flow passes back to the await detection process step, highlighted by box 156. But if detection occurs, the system changes from vacancy mode operation to occupied mode operation, as represented by box 160 (i.e., the occupied mode is entered. Once in occupied mode, an occupied message is transmitted or like global variable set, as indicated by box 162.

After sending the occupied mode signal, the circuitry 20 is set to a high gain configuration (by microcontroller or microcomputer 24), as indicated by box 164. A delay counter is then initiated to a preset value, preferably by software operating in microcomputer 24, as indicated by box 166. The system 10 awaits detection of a change of mode (from occupied to vacant), as indicated by box 168. Decision diamond 170 represents determination of a detected presence. If detection of a person's presence is determined (again, while in occupied mode), an incremental value ΔT1 is added to the delay counter, as indicated by box 172. The larger the delay counter value, the longer the sensor system 10 will stay in the occupied mode. If there is no detection over time, a check is then made to determine whether the delay counter value is less than zero, as indicated by box 174. If the delay counter value is less than zero, a message is transmitted communicating that the vacant mode is to be entered, as indicated by box 176. The system 10 goes back to the enable low gain configuration (box 152), for the vacant mode operation. If the Delay Counter is still greater than zero, a small amount is subtracted (ΔT2) from the delay counter value, as indicated by box 178 and program flow returns to the await detection of change of mode box 168.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A micro-motion occupancy sensor system that monitors for a presence of a person in a room, in different monitoring modes, to regulate power delivery to the room, the system comprising:
    a multimode lens for receiving passive infrared (IR) energy and focusing the IR energy as a plurality of passive IR beams;
    a pyroelectric detector for receiving the focused IR beams from the multimode lens and generating an electrical signal based on the received, focused IR beams;
    a processing circuit that includes an amplifier and a filter, for processing the resultant electrical signal and generating an interrupt signal and an analog output signal based upon the electrical signal; and
    a controller for receiving and processing the interrupt signal and the analog output signal to determine whether a person has entered the room or is maintaining their presence within the room;
    wherein the controller controls the processing in a vacant mode of operation where a person's presence is not detected and in an occupied mode of operation when a person's presence has been detected.

2. The micro-motion occupancy sensor system as set forth in claim 1, wherein in the occupied mode, the controller generates and sends a gain control signal to the processing circuit to boost the gain of the amplifier therein.

3. The micro-motion occupancy sensor system as set forth in claim 1, wherein the controller identifies a sufficient change in signal level to determine person's presence.

4. The micro-motion occupancy sensor system as set forth in claim 3, wherein in the vacant mode, the controller changes to the occupied mode if a presence of a person is detected and the amplification is increased while in the occupied state, and after a timeout period where no motion is sensed, the system reverts to the vacant state with lower amplification.

5. The micro-motion occupancy sensor system as set forth in claim 3, wherein in the occupied mode, the mode is maintained for a predetermined timeout period and wherein if no increase in the analog signal level is detected before an end of the predetermined timeout period, the controller changes the mode from occupied to vacant.

6. The micro-motion occupancy sensor system as set forth in claim 1, wherein the controller generates a message signal in response to a change of mode.

7. The micro-motion occupancy sensor system as set forth in claim 6, further comprising a transmitter, wherein the transmitter transmits the message signal.

8. The micro-motion occupancy sensor system as set forth in claim 1, wherein in the vacant mode, the controller operates in a "sleep" state and is awakened when an interrupt signal is received from the processing circuit.

9. The micro-motion occupancy sensor system as set forth in claim 1, wherein multimode lens includes a plurality of annular segments or rings disposed about an axial center of the lens.

10. The micro-motion occupancy sensor system as set forth in claim 9, comprising four annular segments or rings.

11. The micro-motion occupancy sensor system as set forth in claim 9, wherein the annular segments include lenslets that provide separate focused IR beams and wherein a density of the lenslets within an annular segment or ring corresponds to the proximity to the axial center.

12. The micro-motion occupancy sensor system as set forth in claim 10, wherein a first ring that is furthest away from the axial center includes lenslets that are trapezoidal shaped and larger than trapezoidal shaped lenslets in a second ring adjacent the first ring but closer to the axial center.

13. The micro-motion occupancy system as set forth in claim 12, wherein a third ring is proximate to but closer to the axial center than the second ring and comprises an array of pie-shaped lenslets that are smaller that the trapezoidal lenslets of the second ring.

14. The micro-motion occupancy system as set forth in claim 13, wherein a fourth ring or segment is positioned proximate to the third ring and surrounds the axial center.

15. The micro-motion occupancy sensor system as set forth in claim 1, wherein the pyroelectric detector is formed with either one sensor or two sensors for sensing either one or two passive IR beams, wherein in the case where the pyroelectric detector is formed with one sensor, a change of mode occurs in response to a detected increase in IR energy followed by a detected decrease in IR energy and wherein in the case where the pyroelectric detector is formed with two sensors, a change of mode occurs in response to a detected increase in IR energy in a beam received in one of the sensors followed by a detected increase in IR energy received in the other of the sensors.

16. The micro-motion occupancy sensor as set forth in claim 1, wherein the multimode lens is formed in a disk shape or rectangular shape.

\* \* \* \* \*